United States Patent
Wieczorek

[15] 3,666,667
[45] May 30, 1972

[54] ALKALINE CYANIDE-FREE AQUEOUS DESCALING COMPOSITION CONTAINING ELEMENTAL SULFUR

[72] Inventor: Theophil J. Wieczorek, West Haven, Conn.

[73] Assignee: Enthone Incorporated, West Haven Industrial Park, Conn.

[22] Filed: Apr. 14, 1969

[21] Appl. No.: 816,089

[52] U.S. Cl. ..................252/87, 134/2, 204/143, 204/145, 252/80
[51] Int. Cl. ..................................C02b 5/02
[58] Field of Search..................252/87, 86, 79.5, 80, 156; 134/2, 1, 41; 204/145 R, 145 F

[56] References Cited

UNITED STATES PATENTS

| | | | |
|---|---|---|---|
| 2,915,444 | 12/1959 | Meyer | 204/145 |
| 3,293,159 | 12/1966 | Mekjean | 204/145 X |
| 2,939,826 | 6/1960 | Gulick | 204/145 |
| 3,043,758 | 7/1962 | Machu | 204/145 |
| 3,254,011 | 5/1966 | Zaremski | 204/145 R |

*Primary Examiner*—John T. Goolkasian
*Assistant Examiner*—M. E. McCamish
*Attorney*—Elwood J. Schaffer and Roger J. Drew

[57] ABSTRACT

The electrolytic removal of oxides of iron, such as rust and/or scale, from the surfaces of ferrous metals is materially accelerated by incorporating a minor amount of elemental sulfur into the alkaline cyanide-free aqueous electrolyte also containing a complexing agent capable of complexing iron ions into soluble form, and an alkaline material, and having a pH of above 10. Concentrate compositions adapted to be mixed together with water to form the electrolyte are also embodied within the invention.

22 Claims, No Drawings

ALKALINE CYANIDE-FREE AQUEOUS DESCALING COMPOSITION CONTAINING ELEMENTAL SULFUR

BACKGROUND OF THE INVENTION

1. Field of the Invention

This invention relates to the removal of foreign matter, especially oxides or iron and scale, from the surfaces of ferrous metals. More particularly this invention relates to new and improved electrolytes and a method for the electrolytic removal of iron oxides and scale from the surfaces of ferrous metals. Additionally this invention is concerned with concentrate compositions adapted for mixing with an aqueous liquid, usually water, to form the new electrolytes herein.

2. Description of the Prior Art.

Alkaline deoxidizing and descaling solutions heretofore preferably have contained one or more alkali cyanides, e.g. sodium cyanide or potassium cyanide, in addition to a complexing agent for complexing the iron into soluble form and an alkali hydroxide or hydroxides, e.g., an alkali metal hydroxide or potassium hydroxide, and an aqueous liquid such as water. Although these alkaline cyanide solutions have given good results for the electrolytic deoxidizing and descaling of ferrous metal surfaces and are fast acting, the presence of the cyanide in the solutions present serious problems in connection with the disposal of the solutions due to the extreme toxicity of the cyanide. Indeed legislation recently enacted by a number of states prohibits discharge of cyanide-containing liquid effluents into streams, rivers, etc. unless the cyanide is first eliminated or removed down to a very low level. The removal of cyanide from the liquid effluents prior to its discharge into rivers and streams is an expensive time-consuming operation.

Alkaline deoxidizing solutions presently being utilized usually omit the cyanide and contain caustic soda, a complexing or chelating agent such as an alkali metal gluconate, water, and occasionally phosphates. Although these solutions are effective for electrolytically removing oxides of iron such as rust from ferrous metal surfaces, they suffer from the standpoint of being much slower acting than the cyanide-containing solutions. Further scale can not be satisfactorily removed with the omission of cyanide from such solutions. Moreover their deoxidizing action is not as thorough and complete as that of the cyanide-containing solutions as the resultant steel surfaces that were electrolytically treated with such cyanide-free solutions as electrolyte were not as white or free of iron oxides or smut-free as was the case when employing the cyanide-containing solutions. Further the presence of the phosphates in the cyanide-free solutions was disadvantageous for the reasons that they too can present a waste disposal problem.

One object of this invention is to provide new alkaline solutions for the electrolytic removal of oxides of iron and scale from the surfaces of ferrous metals which are free of cyanide, yet are fast acting and achieve good deoxidizing and descaling of the ferrous metal surfaces and are similar in these respects to the prior cyanide-containing alkaline deoxidizing and descaling solutions.

Another object is to provide new concentrate compositions adapted to be mixed together with an aqueous liquid, usually water, to form the new alkaline electrolyte solutions.

Additional objects and advantages will be readily apparent as the invention is hereinafter described.

SUMMARY OF THE INVENTION

In accordance with the present invention, I have found that the electrolytic removal of oxides of iron such as, for example rust and/or scale, from the surface of ferrous metals utilizing as the electrolyte an alkaline cyanide-free aqueous solution containing the complexing agent capable of complexing iron ions into soluble form and an alkaline material and having a pH of above 10 is satisfactorily effected and appreciably accelerated by incorporating in the electrolyte a minor amount of elemental sulfur. Such amount of elemental sulfur is that minor amount of sulfur which is sufficient to accelerate appreciably or materially the electrolytic removal of the oxides of iron from the ferrous metal surface. In addition, the electrolytic removal of smut from ferrous metal surfaces may be appreciably accelerated by this invention. The deoxidizer and descaler compositions and method of this invention constitute a considerable improvement in this art for the reasons: (1) avoids the use of cyanide and the hazards and problems attendant therewith while still attaining fast or rapid deoxidizing and descaling of ferrous metal surfaces which previously required the presence of cyanide: (2) provides a thorough and substantially complete deoxidizing of ferrous metal surfaces which was previously achieved only by the cyanide-containing electrolytes; (3) avoids the use of phosphates and the aforementioned disadvantages attendant with its use, and (4) reduces the time required for deoxidizing ferrous metal surfaces to obtain a substantially oxide-free, clean surface, which is whitish in appearance or has the characteristic metallic appearance in the case of steel, by as much as 50 percent and more.

The invention is eminently suited for the rapid removal of oxides or iron such as rust from the surface of ferrous metal articles. Such iron oxides include ferrous and ferric oxides. The invention rapidly removes rust from iron surfaces as well as from surfaces of low and high carbon steel. The invention is also well suited for the removal of scale, for example heat treat scale, from ferrous metal surface with or without the aid of a supplemental treatment. The scale, which is usually electrically conductive and usually composed of oxides of iron, ordinarily adheres tenaciously to the ferrous surfaces and was difficult to remove by prior cleaning treatment. The supplemental treatment which may be utilized herein to remove the scale is brushing and/or washing of the ferrous metal surface after the electrolytic treatment. The invention is also utilizable for the removal of other foreign matter including smut, from the ferrous metal surfaces. Smut are surface films or deposits of foreign matter, which in the case of the carbon steels appear to be films of carbon or carbon-containing material, and are detrimental to subsequent plating processes.

The alkaline, non-cyanide electrolyte solution of this invention is utilizable for the electrolytic removal of iron oxides and smut from the surfaces of ferrous metals with the ferrous metal article or object to be deoxidized and desmutted connected as the cathode or anode of the electrolytic cell for the entire period of the electrolysis, or with periodic reversal of current whereby the ferrous metal article is alternately the anode and cathode. Periodic reversal of current with the article alternately the anode and cathode or cathode and anode is preferred for the reasons hereinafter set forth. The current may be direct current or alternating current.

The non-cyanide electrolyte solution herein is necessarily an alkaline solution with a pH above 10. The alkalinity is supplied by a suitable alkaline material, usually a strong alkali, for example an alkali metal hydroxide or hydroxides, e.g., Na OH and/or KOH, present in the solution in amount sufficient to provide it with a pH of above 10.

The complexing agent can be any complexing agent that will complex iron ions into soluble form. Such is important to enable the removal of the iron of the deoxidized or descaled ferrous metal surface from the surface. If not complexed into soluble form, the iron tends to remain on the ferrous metal surface. Exemplary of the complexing agent are the following:

A. Hydroxycarboxylic acids of the formula

wherein R and $R_1$ are radicals from the group consisting of —$CH_2OH$ and —COOH with the proviso that at least one of R and R is —COOH, and n is an integer of value of 1–5, the water-soluble salts of such acids, and mixtures thereof, e.g., glucoheptonic acid, gluconic acid, saccharic acid, glyceric acid, tartaric acid, water-soluble alkali salts of such acids, for instance alkali metal, e.g., sodium or potassium, salts of such acids, and mixtures thereof.

B. Aldose and ketose monosaccharides, especially the aldohexose and ketohexose monosaccharides or sugars, e.g., glucose and fructose or laevulose, a disaccharide such as sucrose, and polysaccharides such as starches; polyol compounds including glycerine, mannitol and sorbitol; and alkylene glycols such as ethylene glycol and propylene glycol.

C. Ethylene diamine di-, tri- and tetraacetic acid salts, e.g., alkali metal salts, for instance, ethylene diamine diacetic acid disodium slat, ethylene diamine triacetic acid trisodium salt, and ethylene diamine tetraacetic acid tetrasodium salt. Also compounds wherein one or more of the acetate groupings is replaced with an ethanol group, such as hydroxyethyl ethylenediamine triacetic acid salts and dihydroxyethylethylenediamine diacetic acid salts.

D. Alkylolamines such as, for instance triethanolamine, diethanolamine, ethanolamine and corresponding propanolaamines.

The complexing agent is utilized in the electrolyte herein in amount sufficient to complex the iron ions into soluble form, i.e. a form wherein the iron is soluble in the alkaline non-cyanide electrolyte. The complexing agent will usually be utilized in the electrolyte in amount within the range of from above 5 grams per liter to saturation.

Certain of the complexing agent compounds previously disclosed herein are also mild reducing agents. These compounds are the aldose and ketose monosaccharides, especially the aldohexose and ketohexose monosaccharides or sugars, e.g., glucose and fructose or laevulose. These compounds serve to aid or facilitate the descaling of the ferrous metal surface, especially when present in the electrolyte solution in amount in excess of the amount required to complex the iron ions.

The electrolytes of this invention are utilizable at room temperature of the solution for effecting the electrolytic deoxidizing and descaling of the ferrous metal surfaces, and at elevated temperature of the electrolyte up to 200° F.

This invention also contemplates concentrate compositions adapted to be mixed together with an aqueous liquid, usually water, to form the alkaline non-cyanide liquid electrolyte for the electrolytic deoxidizing and descaling of the ferrous metal surfaces. The concentrate composition comprises a mixture of the complexing agent capable of complexing iron ions into soluble form, the alkaline material, usually a strong alkali such as an alkali metal hydroxide, and the elemental sulfur. The complexing agent, reducing agent, alkaline material and elemental sulfur are utilized in the concentrate composition in effective amounts sufficient to provide in the ultimate liquid electrolyte amounts of these constituents which are sufficient to perform the function for each such constituent as previously disclosed herein.

DESCRIPTION OF THE PREFERRED EMBODIMENTS

The elemental sulfur is preferably utilized in the deoxidizer and descaler concentrate compositions herein in amount, by weight, of about 0.1–5 percent, more preferably about 0.5–5 percent, based on total concentrate.

The deoxidizing and descaler concentrate compositions herein are preferably mixed together with an aqueous liquid such as water, to form the liquid electrolyte of this invention in the proportions of preferably about 1 lb. of the concentrate to the saturation concentration thereof per gallon of water, more preferably about 1 -½–3 lbs. per gallon.

The elemental sulfur is present in the preferred liquid electrolyte solution of this invention in a preferred amount, by weight, of about 0.015–2.0 percent, more preferably about 0.075–2.0 percent, based on total solution.

Although the elemental sulfur may be incorporated into the liquid electrolyte by admixing the sulfur with the already prepared liquid electrolyte solution, for reasons of convenience the sulfur is preferably made a constituent of the concentrate compositions herein so that when the user forms the electrolyte solution by admixing the concentrate with the aqueous liquid, the sulfur is automatically incorporated in the solution.

The preferred electrolytic deoxidizing and/or descaling in accordance with this invention involves the employment of periodic reversal of current, with the ferrous metal article being deoxidized and/or descaled alternately being made the anode and cathode or cathode and anode of the electrolytic cell. The periodic current reversal is preferred as it achieves complete or virtually complete removal of rust and scale, whereas the modes of deoxidizing and descaling herein wherein the ferrous metal article is the anode or cathode for the entire electrolytic deoxidizing and descaling period may not completely remove the oxides of iron and scale. However when only light rust is present on the ferrous metal surfaces, the two last-mentioned modes of deoxidizing, i.e., wherein the ferrous metal article is the anode or cathode for the entire electrolytic period, may be satisfactory for derusting such surfaces. Further, when the oxides of iron intended to be removed are non-conductive ferric types of oxide, the best deoxidizing is achieved by making the ferrous metal article or articles the cathode only. With the preferred periodic reversal of current, approximately equal periods as anode and cathode for the ferrous metal article is preferred. A time of about 7 seconds for each anode and cathode period of the ferrous metal article was found best at a current density of 75 a. s. f. However unequal anode and cathode times for the ferrous metal article are utilizable. Specifically alternate periods of 14 seconds as anode and 7 seconds as cathode have been tested for the ferrous metal article being deoxidized with satisfactory results; and alternate periods of 7 seconds as anode and 14 seconds as cathode have also been tested with satisfactory results.

The current density utilized for the electrolytic deoxidizing and descaling herein is preferably in the range of 50–100 a. s. f. The other electrode or electrodes for the electrolytic deoxidizing and descaling can be of any suitable material or metal well known to the art. However with periodic current reversal or when the ferrous metal article to be deoxidized and descaled is the cathode during the entire electrolytic period in the non-preferred embodiment, the other electrode or electrodes are preferably of carbon inasmuch as the anodic action during the electrolysis will attack many metals.

The preferred pH of the electrolyte solution herein is in the range of about 11–12.5.

The temperature of the electrolyte solution is preferably in the range of from about 160°–200° F. during the electrolytic deoxidizing and/or descaling.

Preferably the electrolytes and concentrate compositions herein contain a reducing sugar as a constituent for aiding or facilitating the descaling of ferrous metal surfaces containing the scale. The reducing sugar can be, for example, an aldose or ketose monosaccharide, e.g., an aldohexose or ketohexose monosaccharide, for example glucose and fructose or laevulose; or a disaccharide such as maltose or lactose. The disaccharide, sucrose, is not a reducing sugar and is not utilizable as a reducing sugar constituent, although sucrose is a suitable complexing agent for iron ions and is hereinbefore disclosed. When the complexing agent ingredient is the aldose or ketose monosaccharide, especially the aldohexose or ketohexose monosaccharide, e.g., glucose or fructose or laevulose, it is ordinarily unnecessary to incorporate another reducing sugar ingredient in the electrolyte solution or concentrate composition inasmuch as the aldose or ketose monosaccharide performs the dual function of complexing the iron and aiding or facilitating the descaling of the ferrous metal surface. However, to obtain the benefit of this dual function, the reducing sugar aldose or ketose monosaccharide is preferably present in the electrolyte in an excess over the amount required to complex the iron ions into soluble form. When the reducing sugar is a compound different from the complexing agent ingredient, the reducing sugar is utilized in the electrolyte in an effective or minor amount, sufficient to facilitate the descaling of the ferrous metal surface. A preferred amount of the reducing sugar in the liquid electrolyte is from about 1.5–4 percent by weight, based on total electrolyte. The reducing sugar constituent of this invention is a sugar which reduces Fehlings solution, and reducing sugars are well known materials and are defined in the "Concise Chemical and Technical Dictionary," edited by H. Bennett, Chemical Publishing Company, Inc. (1947).

The use of dextrose, i.e., d-glucose, as the reducing sugar constituent in the liquid electrolyte has given excellent results in the deoxidizing and descaling of ferrous metal surfaces.

The preferred complexing agents are chelating agents which are hydroxycarboxylic acids of the formula

R —(CHOH)—$_n$ R$_1$ wherein R and R$_1$ are radicals from the group consisting of —CH$_2$OH and —COOH with the proviso that at least one of R and R$_1$ is —COOH and n is an integer of value of 1–5, the water-soluble salts of such acids and mixtures thereof. Sodium glucose glucoheptonate was found to give especially good results as the complexing agent.

The deoxidizer-descaler electrolyte and concentrate compositions of this invention preferably contain as additional constituents an alkali metal bromide and an alkali metal chloride. The two last-mentioned constituents act synergistically in attacking the ferrous metal surface selectively to assist or aid in the breaking of bonds between the ferrous metal surface and the scale, but without any substantial etching or corroding of the ferrous metal surface. The chloride also is believed to solubilized oxides and hydroxides of iron at the interface during the electrolysis. Sodium bromide or potassium bromide and sodium chloride or potassium chloride are exemplary of the alkali metal bromides and chlorides and are utilizable. The combination of potassium bromide and sodium chloride was found to give especially good results. The alkali metal bromide and alkali metal chloride are utilized in the preferred electrolyte herein each in amount sufficient to act synergistically with each other to assist in breaking any bonds between the ferrous metal surface and scale The amounts of the alkali metal bromide and alkali chloride in the concentrate compositions herein are an amount of each which is sufficient to provide in the ultimate alkaline non-cyanide electrolyte amounts of such constituents sufficient to act synergistically with each other to aid in breaking the bonds between the ferrous metal surface and the scale. The deoxidizer-descaler liquid electrolyte and concentrate composition may also contain an alkali metal carbonate, e.g., sodium or potassium carbonate, for imparting alkalinity to the electrolyte at a relatively low cost. Soda ash, i.e., Na$_2$Co$_3$, is particularly suitable for this purpose. The amount of the alkali metal carbonate, when utilized, will vary in accordance with the amount of alkali metal hydroxide utilized, and is sufficient, together with the alkali metal hydroxide, to provide the electrolyte solution, or ultimate electrolyte solution in the case of the solid concentrate, with a pH of above 10 and preferably in the range of about 11–12.5. In addition to imparting alkalinity, the sodium carbonate inhibits excessive attack or pitting of the descaled or deoxidized ferrous metal surfaces and thus minimizes the amount of iron going into solution thereby enabling longer life of the complexing agents.

The preferred concentrate compositions herein are preferably mixed together with the aqueous liquid, usually water, to form the electrolyte in the proportions of about 1 to about 4 lbs. of the concentrate composition per gallon of the aqueous liquid. The mixing together of the concentrate compositions of this invention and the aqueous liquid will usually be effected by adding the aqueous liquid to the concentrate composition or the concentrate to the aqueous liquid, and usually with stirring during and/or after addition of the one to the other is completed.

The preferred concentrate compositions of this invention contain the following constituents within the proportion ranges hereafter set forth.

|  | Percent by Weight |
|---|---|
| Alkali metal carbonate | about 10 to about |
| Reducing sugar (calculated as dextrose) | 2 to about 20 |
| Alkali metal bromide | about 0.5 to about 5.0 |
| Alkali metal chloride | about 1.0 to about 10 |
| Alkali metal glucoheptonate | about 2 to about 20 |
| Alkali metal hydroxide | about 10 to about 70 |
| Elemental sulfur | about 0.05 to about 2.0 |

Such concentrate compositions are mixed together with the aqueous liquid, usually water, to from the electrolyte in the proportions set forth previously herein.

The most preferred concentrate compositions of this invention contain the following constituents within the proportion ranges hereafter specified:

|  | Percent by Weight |
|---|---|
| Dextrose | about 7.5 to about 15 |
| K Br | about 2 to about 3 |
| Na Cl | about 1.5 to about 3.0 |
| Sodium glucoheptonate | about 5 to about 10 |
| Na OH | about 40 to about 50 |
| Sulfur, flowers of | about 0.1 to about 1.0 |
| Sodium carbonate | about 25 to about 35 |

The concentrate composition may also contain a detergent such as, for instance Miranol J S concentrate, which is a synthetic detergent of the sulfated fatty acid amide type, and/or a wetting agent. Such concentrate compositions, which are solid compositions, are mixed together with the aqueous liquid, usually water, to form the electrolyte in the proportions of preferably of about 1 to about 4 lbs. of the concentrate composition per gallon of the aqueous liquid.

Preferred liquid electrolyte compositions of this invention are aqueous solutions containing the following constituents within the proportion ranges hereafter set forth:

|  | Grams/liter |
|---|---|
| Alkali metal carbonate | about 25–120 |
| Reducing sugar (calculated as dextrose) | about 5–50 |
| Alkali metal bromide | about 1–15 |
| Alkali metal chloride | about 2.5–25 |
| Alkali metal glucoheptonate | about 5–50 |
| Alkali metal hydroxide | about 25–170 |
| Elemental sulfur | about 0.1–5 |

The most preferred liquid electrolyte compositions herein are aqueous solutions containing the following constituents within the proportion ranges hereafter set forth:

|  | Grams/liter |
|---|---|
| Dextrose | about 17–35 |
| K Br | about 5–7.5 |
| Na Cl | about 3.5–7.5 |
| Sodium glucoheptonate | about 10–25 |
| Na OH | about 100–120 |
| Sulfur, flowers of | about 0.25–2.5 |
| Sodium carbonate | about 60–85 |

The following examples of desmutter-deoxidizer concentrates adapted to be mixed together with water to form alkaline non-cyanide desmutter-deoxidizer electrolytes further illustrate the invention without being restrictive thereof.

EXAMPLE 1

|  | Percent by Weight |
|---|---|
| Na$_2$Co$_3$ | 31.5 |
| Dextrose | 10.0 |
| K Br. | 2.5 |
| Na Cl | 2.0 |
| Sodium glucoheptonate | 8.0 |
| Na OH | 45.0 |
| Sulfur, flowers of | 0.5 |

| | |
|---|---|
| Miranol J S concentrate | 0.5 |

Miranol J S is a trademark name for a synthetic detergent of commerce. The solid concentrate of EXAMPLE 1 is mixed together with water in the proportions of 1–4 lbs. thereof per gallon of water to form the desmutter-deoxidizer electrolyte solution. Such electrolyte is utilized at an electrolyte temperature preferably in the range of 160°–200° F. and with periodic reversal of current, i.e., with the ferrous metal article being electrolytically deoxidized and desmutted alternately the anode and cathode for typically periods of 7 seconds as each electrode and with a voltage and current density of typically 6–14 V. and 3–150 a. s. f. respectively.

EXAMPLE 2

| | Percent by Weight |
|---|---|
| $Na_2CO_3$ | 37.0 |
| Dextrose | 8.0 |
| K Br. | 2.5 |
| Na Cl | 2.0 |
| Sodium glucoheptonate | 10.0 |
| Na OH | 40.0 |
| Sulfur, flowers of | 0.3 |
| Miranol J S concentrate | 0.2 |

The solid concentrate of EXAMPLE 2 is mixed together with water in the proportions of 1–4 lbs. thereof per gallon of water to form the desmutter-deoxidizer electrolyte solution. This electrolyte is utilized at an electrolyte temperature preferably in the range of 160°–200° F. and with periodic reversal of current similarly as in EXAMPLE 1 to electrolytically desmut and deoxidize ferrous metal articles.

EXAMPLE 3

| | Percent by Weight |
|---|---|
| $Na_2CO_3$ | 32.0 |
| Dextrose | 10.0 |
| K Br. | 3.0 |
| Na Cl | 2.0 |
| Sodium glucoheptonate | 7.0 |
| Na OH | 45.0 |
| Sulfur, flowers of | 0.7 |
| Miranol J S concentrate | 0.3 |

The solid concentrate of EXAMPLE 3 is mixed together with water in the proportions of 1–4 lbs. thereof per gallon of water to form the desmutter-deoxidizer electrolyte solution. Such electrolyte is utilized at an electrolyte temperature in the range of 160°–200° F. and with periodic current reversal similarly as in EXAMPLE 1 to electrolytically desmut and deoxidize ferrous metal articles.

EXAMPLE 4

| | Percent by Weight |
|---|---|
| K Br. | 3.0 |
| $Na_2CO_3$ | 30.0 |
| Dextrose | 10.0 |
| Na Cl | 2.0 |
| Sodium glucoheptonate | 10.0 |
| Sulfur, flowers of | 0.5 |
| Miranol J S concentrate | 0.5 |
| Na OH | 44.0 |

The solid concentrate of EXAMPLE 4 is mixed together with water in the proportions of 1–4 lbs. thereof per gallon of water to form the desmutter-deoxidizer electrolyte solution. This electrolyte is utilized at an electrolyte temperature in the range of 160°–200° F. and with periodic reversal of current similarly as in EXAMPLE 1 to electrolytically desmut and deoxidize ferrous metal articles.

The concentrate composition and the electrolyte formed therefrom of foregoing EXAMPLE 1 was found to give especially good results for the deoxidizing and descaling.

EXAMPLE 5

Tests were conducted to compare a sulfur-containing desmutter-deoxidizer of this invention with a prior desmutter-deoxidizer free of sulfur, for the electrolytic removal of iron oxide and smut from the surfaces of steel parts.

PART A

Anchor fasteners of light and medium scaly, heat treated, high carbon steel were made the anode in a 2-liter alkaline, cyanide-free aqueous solution prepared as hereafter described and at a solution temperature of 170° F. The solution was prepared by dissolving in water 24 oz. of the following concentrate per gallon:

| | Percent by Weight |
|---|---|
| $Na_2CO_3$ | 31.5 |
| Dextrose | 10.0 |
| K Br. | 2.5 |
| Na Cl | 2.0 |
| Sodium glucoheptonate | 8.0 |
| Na OH | 45.0 |
| Sulfur, flowers of | 0.5 |
| Miranol J S concentrate | 0.5 |

The steel fasteners were electrolytically descaled in this electrolyte solution at about 75–125 amps/square foot with periodic reversal of current wherein the fasteners were anodic for 6 seconds and cathodic for 12 seconds. The fasteners descaled in 2 to 4 minutes leaving a white, descaled and smut-free steel surface.

Under substantially identical conditions and utilizing a substantially identical electrolyte solution, carbon smutty, oily roller skate steel stock was desmutted to yield white, smut-free steel surface in 1 minute

PART B

When employing substantially identical conditions as utilized in PART A of this EXAMPLE and an electrolyte solution prepared by dissolving in water 2 lbs. of the following concentrate per gallon:

| | Percent by Weight |
|---|---|
| $Na_2CO_3$ | 39.0 |
| Dextrose | 9.0 |
| K Br | 2.5 |
| Tetrasodium pyrophosphate | 10.0 |
| Na Cl | 2.0 |
| Sodium glucoheptonate | 4.5 |
| Na OH | 25.5 | the descaling of the light and medium scaly Anchor fasteners was very slow and incomplete requiring 7–11 minutes time and leaving dark steel surfaces.

When employing substantially identical conditions as employed in PART A of this EXAMPLE and the sulfur-free electrolyte solution set forth immediately above, carbon smutty, oily roller skate steel stock required a materially longer time to desmut than was required in PART A herein, to yield steel surfaces still containing some smut at 2 and 3 minutes treatment time.

EXAMPLE 6

Tests were conducted to compare a sulfur-containing deoxidizer-desmutter of this invention with a prior deoxidizer-desmutter free of sulfur for the electrolytic removal of iron oxides or rust from the surfaces of steel parts.

PART A

A solution was prepared by dissolving in water 2 lbs. of the following concentrate per gallon.

| | Percent by Weight |
|---|---|
| $Na_2CO_3$ | 31.5 |
| Dextrose | 10.0 |
| K Br | 2.5 |
| Na Cl | 2.0 |
| Sodium glucoheptonate | 8.0 |
| Na OH | 45.0 |
| Sulfur, flowers of | 0.5 |
| Miranol J S concentrate | 0.5 |

Steel parts having a moderate amount of rust on their surfaces were made the anode in such electrolyte solution, which was an alkaline and cyanide-free solution, at a solution temperature of 170° F. At a current density of 75 a. s. f. with periodic reversal of current wherein the steel parts were alternately made the anode for 7 seconds and cathode for 7 seconds, complete de-rusting and de-oxidizing of the parts was attained in 2 minutes treatment time with virtually no attack on the steel surfaces.

PART B

A solution was prepared by dissolving in water 2 lbs. of the following concentrate per gallon:

| | Percent by Weight |
|---|---|
| $Na_2CO_3$ | 39.0 |
| Dextrose | 9.0 |
| K Br | 2.5 |
| Tetrasodium pyrophosphate | 10.0 |
| Na Cl | 2.0 |
| Sodium glucoheptonate | 4.5 |
| Na OH | 25.5 |
| Triethanolamine | 7.0 |
| Miranol J S concentrate | 0.5 |

Steel parts having a moderate amount of rust on their surfaces were subjected to electrolytic treatment in such electrolyte solution with periodic reversal of current under substantially identical conditions as employed in PART A of this EXAMPLE. The rust was not completely removed from the steel parts after 15 minutes treatment time.

The term "oxides of iron" is used in the appended claims in a broad sense to mean not only oxides of iron such as, for example, rust but also scale when present on the ferrous metal surface or surfaces. The scale may be formed during annealing and heat treatment of the ferrous metal and includes oxides of iron and/or other undesirable oxide- like foreign matter on the ferrous metal surfaces.

What is claimed is:

1. In an alkaline non-cyanide liquid aqueous electrolyte for the electrolytic removal of oxides of iron from the surfaces of ferrous metals and comprising an alkaline cyanide-free aqueous solution containing a complexing agent capable of complexing iron into soluble form and an alkaline material, the solution having a pH of above 10, the improvement which comprises having present in the aqueous solution a minor amount, sufficient to accelerate appreciably the electrolytic removal of the oxides of iron from the ferrous metal surface, of elemental sulfur.

2. The electrolyte of claim 1 wherein the elemental sulfur is flowers of sulfur.

3. The electrolyte of claim 1 wherein the complexing agent is a chelating agent from the group consisting of hydroxycarboxylic acids of the formula

R—(CHOH)—$_n$ R$_1$ wherein R and R$_1$ are radicals from the group consisting of — CH$_2$OH and —COOH with the proviso that at least one of R and R$_1$ is —COOH, and n is an integer of value of 1–5, the water-soluble salts of such acids, and mixtures thereof.

4. The electrolyte of claim 3 wherein the complexing agent is sodium glucoheptonate.

5. The electrolyte of claim 1 wherein the electrolyte contains a reducing sugar as an additional constituent.

6. The electrolyte of claim 5 wherein the reducing sugar is dextrose.

7. The electrolyte of claim 1 wherein the complexing agent is a reducing sugar from the group consisting of aldose and ketose monosaccharides.

8. The electrolyte of claim 1 wherein the alkaline material is an alkali metal hydroxide.

9. The electrolyte of claim 1 wherein the elemental sulfur is present in amount, by weight, of about 0.015–2.0 percent, based on total electrolyte solution.

10. The electrolyte of claim 1 wherein the elemental sulfur is present in amount, by weight, of about 0.075–2.0 percent, based on total electrolyte solution.

11. In a concentrate composition adapted to be mixed together with an aqueous liquid to form an alkaline non-cyanide electrolyte for the electrolytic removal of oxides of iron from the surface of ferrous metals and comprising a mixture of a complexing agent capable of complexing iron ions into soluble form and an alkaline material, the improvement which comprises having present in the concentrate composition a minor amount, sufficient to accelerate appreciably removal of oxides of iron from the ferrous metal surface by the ultimate electrolyte during the electrolytic treatment, of elemental sulfur.

12. The concentrate composition of claim 11 wherein the elemental sulfur is flowers of sulfur.

13. The concentrate composition of claim 11 wherein the complexing agent is a chelating agent from the group consisting of hydroxycarboxylic acids of the formula

R—(CHOH)—$_n$ R$_1$ wherein R and R$_1$ are radicals from the group consisting of — CH$_2$OH and —COOH with the proviso that at least one of R and R$_1$ is —COOH, and n is an integer of value of 1–5, the water-soluble salts of such acids and mixtures thereof.

14. The concentrate composition of claim 13 wherein the complexing agent is sodium glucoheptonate.

15. The concentrate composition of claim 1 containing a reducing sugar as an additional ingredient.

16. The concentrate composition of claim 15 wherein the reducing sugar is dextrose.

17. The concentrate composition of claim 11 further characterized by containing an alkali metal bromide and an alkali metal chloride.

18. The concentrate composition of claim 11 wherein the alkaline material is an alkali metal hydroxide.

19. The concentrate composition of claim 11 wherein the complexing agent is a reducing sugar from the group consisting of aldose and ketose monosaccharides.

20. The concentrate composition of claim 11 wherein the elemental sulfur is present in amount, by weight, of about 0.1%–5%, based on total concentrate.

21. The concentrate composition of claim 11 wherein the elemental sulfur is present in amount, by weight, of about 0.5–5 percent, based on total concentrate.

22. A concentrate composition adapted to be mixed together with water to form an alkaline non-cyanide electrolyte for the electrolytic removal of oxides or iron from surfaces of ferrous metals comprising the following constituents within the proportion ranges hereafter specified:

| | Percent by Weight |
|---|---|
| Dextrose | about 7.5 to about 20.0 |
| K Br | about 2 to about 3 |
| Na Cl | about 1.5 to about 3.0 |
| Sodium glucoheptonate | about 5 to about 10 |
| Na OH | about 40 to about 50 |
| Flowers of sulfur | about 0.1 to about 1 |
| Sodium carbonate | about 25 to about 35 |

* * * * *

UNITED STATES PATENT OFFICE
CERTIFICATE OF CORRECTION

Patent No. 3,666,667    Dated May 30, 1972

Inventor(s) Theophil J. Wieczorek

It is certified that error appears in the above-identified patent and that said Letters Patent are hereby corrected as shown below:

Column 3, line 7, "slat" should read --salt--; line 62, "1-1/2" should read --1 1/2--. Column 5, line 16, "glucose" should be deleted; line 26, "solubilized" should read --solubilize--; line 73, --50-- should be inserted after "about"; line 74, --about-- should be inserted immediately before "2". Column 10, line 40, "1" should read --11--; line 60, "or" should read --of--.

Signed and sealed this 2nd day of January 1973.

(SEAL)
Attest:

EDWARD M. FLETCHER, JR.
Attesting Officer

ROBERT GOTTSCHALK
Commissioner of Patents